(12) United States Patent
Yoshida et al.

(10) Patent No.: US 12,400,281 B2
(45) Date of Patent: Aug. 26, 2025

(54) INFORMATION PROCESSING METHOD

(71) Applicants: TOYOTA JIDOSHA KABUSHIKI KAISHA, Aichi-ken (JP); MONET Technologies Inc., Tokyo (JP)

(72) Inventors: Taiki Yoshida, Tokyo-to (JP); Kenta Nose, Kobe (JP); Masaaki Hashimoto, Tokyo-to (JP); Yoshihiro Yamada, Tokyo-to (JP); Tomohiro Shin, Kanazawa (JP)

(73) Assignees: TOYOTA JIDOSHA KABUSHIKI KAISHA, Aichi-ken (JP); MONET TECHNOLOGIES INC., Tokyo (JP)

( * ) Notice: Subject to any disclaimer, the term of this patent is extended or adjusted under 35 U.S.C. 154(b) by 0 days.

(21) Appl. No.: 18/460,691

(22) Filed: Sep. 5, 2023

(65) Prior Publication Data
US 2024/0087060 A1 Mar. 14, 2024

(30) Foreign Application Priority Data
Sep. 8, 2022 (JP) .................................. 2022-143218

(51) Int. Cl.
*G06Q 50/14* (2012.01)
*G01C 21/34* (2006.01)
(Continued)

(52) U.S. Cl.
CPC ......... *G06Q 50/14* (2013.01); *G01C 21/3453* (2013.01); *G06Q 10/02* (2013.01); *G06Q 50/40* (2024.01)

(58) Field of Classification Search
CPC .............................. G06Q 10/02; G01C 21/3423
See application file for complete search history.

(56) References Cited

U.S. PATENT DOCUMENTS

| 11,604,967 B2* | 3/2023 | Smolyanskiy | G06N 3/063 |
| 2007/0149184 A1* | 6/2007 | Viegers | G06Q 10/06 |
| | | | 701/519 |

(Continued)

FOREIGN PATENT DOCUMENTS

| JP | 2018-205829 A | 12/2018 |
| JP | 2021-086407 A | 6/2021 |
| WO | 2014/002267 A1 | 1/2014 |

OTHER PUBLICATIONS

Panagiotis Georgakis, MultiModal Route Planning in Mobility as a Service, Oct. 2019 (Year: 2019).*

*Primary Examiner* — Ismail A Manejwala
(74) *Attorney, Agent, or Firm* — HAUPTMAN HAM, LLP

(57) ABSTRACT

An information processing method includes receiving first information indicating a travel plan of a user, acquiring, for each on-demand vehicle service, second information indicating boarding/alighting points and operation status of a vehicle, determining and presenting, based on the first and second information, a recommended route for transferring bet ween first and second vehicles belonging to first and second on-demand vehicle services, and making a reservation with the first and second on-demand vehicle services in accordance with the recommended route. In the method, a first boarding/alighting point for boarding the first vehicle, a candidate transfer point for transferring from the first to the second vehicle, and a second boarding/alighting point for alighting from the second vehicle are determined, at least one candidate route from the first to the second boarding/alighting point via the candidate transfer point is determined, and based on the evaluation of each candidate route, the recommended route is determined.

6 Claims, 5 Drawing Sheets

(51) Int. Cl.
*G06Q 10/02* (2012.01)
*G06Q 50/40* (2024.01)

(56) References Cited

U.S. PATENT DOCUMENTS

2015/0161533 A1      6/2015  Kawamoto et al.
2018/0349825 A1*   12/2018  Yamamoto ....... G06Q 10/06314
2021/0302175 A1*    9/2021  Pishdadian ........ G01C 21/3811
2022/0018667 A1*    1/2022  Al-Dujaili .......... G01C 21/3423

* cited by examiner

INFORMATION PROCESSING METHOD

CROSS-REFERENCE TO RELATED APPLICATION

This application claims priority to Japanese Patent Application No. 2022-143218 filed on Sep. 8, 2022, the entire contents of which are incorporated herein by reference.

TECHNICAL FIELD

The present disclosure relates to an information processing method.

BACKGROUND

Patent Literature (PTL) 1 discloses that, based on on-demand vehicle reservation information from a plurality of users, an on-demand vehicle operation schedule is determined so that each user can board and alight from an on-demand vehicle at the desired location within the desired boarding and alighting time slot.

CITATION LIST

Patent Literature

PTL 1: WO 2014/002267 A1

SUMMARY

In a conventional configuration, a service area is defined for each on-demand vehicle service, and users of a certain service can only travel by on-demand vehicles within the corresponding service area. Therefore, in a case in which a user wishes to transfer between on-demand vehicles belonging to a plurality of services, for example, the user needs to make separate reservations for on-demand vehicles in each service, which is complicated.

It would be helpful to improve user convenience in the case of transferring between on-demand vehicles belonging to a plurality of services.

An information processing method according to the present disclosure is an information processing method to be executed by an information processing apparatus capable of communicating with a terminal apparatus used by a user, the information processing method including:

a first step of receiving, from the terminal apparatus, first information indicating a travel plan of the user;

a second step of acquiring, for each on-demand vehicle service in a plurality of on-demand vehicle services, second information indicating a plurality of boarding/alighting points at which a vehicle can be boarded and alighted from and an operation status of the vehicle;

a third step of determining, based on the first information and the second information, a recommended route for traveling by transferring between a first vehicle belonging to a first on-demand vehicle service and a second vehicle belonging to a second on-demand vehicle service;

a fourth step of presenting the recommended route to the user via the terminal apparatus; and a fifth step of reserving the first vehicle and the second vehicle with the first on-demand vehicle service and the second on-demand vehicle service in accordance with the recommended route in response to a request from the terminal apparatus, wherein in the third step, a first boarding/alighting point for boarding the first vehicle, a candidate transfer point for transferring from the first vehicle to the second vehicle, and a second boarding/alighting point for alighting from the second vehicle are determined, at least one candidate route for traveling from the first boarding/alighting point to the second boarding/alighting point via the candidate transfer point is determined, and based on a result of evaluating each candidate route in the at least one candidate route by a predetermined index, a candidate route included in the at least one candidate route is determined as the recommended route.

According to the present disclosure, user convenience can be improved in the case of transferring between on-demand vehicles belonging to a plurality of services.

DETAILED DESCRIPTION

An embodiment of the present disclosure will be described below, with reference to the drawings.

(Outline of Embodiment)

Figure 1:
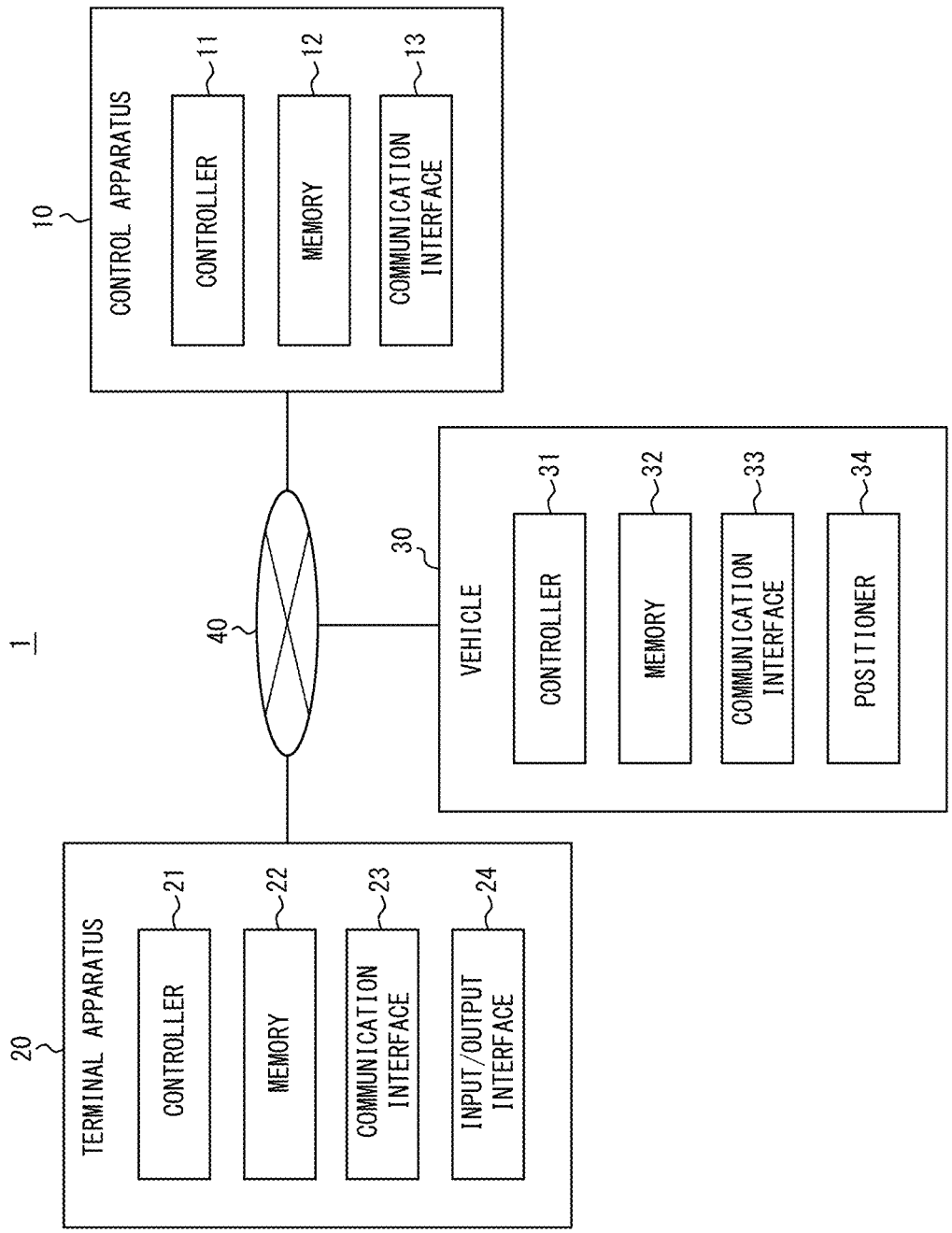
FIG. 1 is a diagram illustrating a configuration example of a system according to an embodiment of the present disclosure.

FIG. 1 is a diagram illustrating a configuration example of a system 1 according to an embodiment of the present disclosure. The system 1 includes a control apparatus 10, a terminal apparatus 20, and a vehicle 30. The control apparatus 10, the terminal apparatus 20, and the vehicle 30 are communicably connected to a network 40 including, for example, the Internet, a mobile communication network, and the like.

The control apparatus 10 is an information processing apparatus that receives first information indicating a travel plan of a user from the terminal apparatus 20 and determines an operation schedule of the vehicle 30. The control apparatus 10 may, for example, be a computer, such as a server apparatus, installed in a data center or other facility. The control apparatus 10 can communicate with the terminal apparatuses 20 and the vehicles 30 via the network 40.

The terminal apparatus 20 is an information processing apparatus that transmits the travel plan to the control apparatus 10 in response to an operation by the user. The terminal apparatus 20 is a smartphone used by the user in the present embodiment but may also be a mobile device, such as a mobile phone or tablet, as well as a general purpose device such as a personal computer (PC). The number of terminal apparatuses 20 included in the system 1 may be freely determined.

The vehicle 30 is an automobile, such as a bus, but is not limited to this and may be any vehicle. The automobile is, for example, a gasoline vehicle, a hybrid electric vehicle (HEV), a plug-in hybrid electric vehicle (PHEV), a fuel cell electric vehicle (FCEV), a battery electric vehicle (BEV), or the like, but is not limited to these. Each vehicle 30 is an autonomous vehicle (AV) in the present embodiment, but the vehicle 30 may be driven by a driver, or the driving may be automated at any level. The automation level is, for example, any one of Level 1 to Level 5 according to the level classification defined by the Society of Automotive Engineers (SAE). Each vehicle 30 may be a Mobility as a Service (MaaS) dedicated vehicle. The number of vehicles 30 included in the system 1 may be freely determined.

The vehicle 30 operates as an on-demand vehicle with an operation schedule (operation route, operation time, and the like) determined in response to a user request (demand). The operation route, operation time, and the like of the vehicle 30 are not predetermined, and the control apparatus 10 dynamically determines the operation schedule according to the user's request (demand). The vehicle 30 transmits and receives various information, including information representing the operation schedule, through communication with the control apparatus 10 and travels according to the operation schedule in a specific area defined for each service 111, 112. Hereinafter, the vehicle 30 traveling in a service A111 as the first on-demand vehicle service may be referred to as the first vehicle 30a, and the vehicle 30 traveling in a service B112 as the second on-demand vehicle service may be referred to as the second vehicle 30b. The vehicle 30 is a passenger bus that an unspecified number of users board and alight from but may instead be a vehicle that a specific number of users board and alight from. In the present embodiment, an example is described in which the boarding/alighting points at which the users can board and alight from the vehicle 30 are predetermined, but the boarding/alighting points may also be dynamically determined according to the users' requests.

Figure 2:
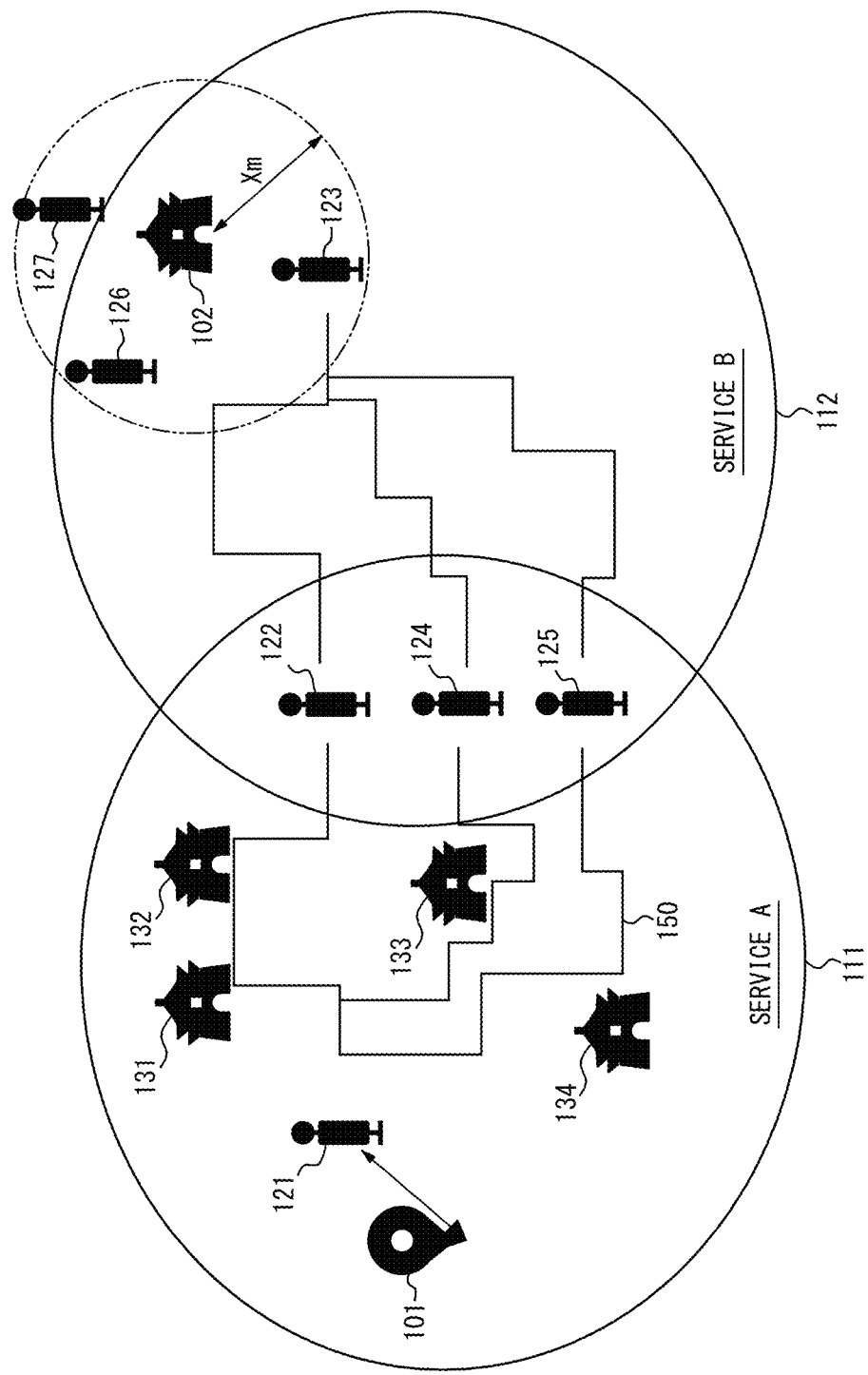
FIG. 2 is a diagram illustrating an example of areas where on-demand vehicle services are provided.

FIG. 2 is a diagram illustrating an example of areas where on-demand vehicle services are provided. In FIG. 2, the user wishes to travel from a departure point 101 to a destination point 102. On-demand vehicle services A111 and B112 are provided in the area illustrated in FIG. 2. In the example in FIG. 2, the departure point 101 is under the authority of service A111, and the destination point 102 is under the authority of service B112. Travel reservations for service A111 and service B112 must be made separately. In a conventional configuration, users have to make each reservation themselves, which is cumbersome. As described below, in the present embodiment, the user simply inputs a travel plan, and the control apparatus 10 automatically makes travel reservations for each service. Service A111 and service B112 are provided by different businesses but may be provided by the same business.

A plurality of boarding/alighting points 121-127 are determined in advance in the areas where the on-demand vehicle services are provided. In the example in FIG. 2, a boarding/alighting point 121 is established in the service area of service A111. Boarding/alighting points 123, 126 are established in the service area of service B112. Boarding/alighting points 122, 124, and 125 are established in the overlapping portion between the service area of service A111 and the service area of service B112. Facilities 131-134 such as restaurants, public facilities, and schools are located in the area illustrated in FIG. 2.

In the above situation, the user operates the terminal apparatus 20 to make a travel reservation by inputting the first information indicating the travel plan, such as the departure point 101, destination point 102, desired reservation date and time, and number of people in the reservation.

The terminal apparatus 20 transmits the first information inputted by the user to the control apparatus 10. Upon receiving the first information indicating the travel plan, the control apparatus 10 identifies a plurality of candidate transfer points where the user can transfer between vehicles 30 belonging to different services and determines a plurality of candidate routes from the departure point 101 to the destination point 102 via each candidate transfer point. Furthermore, the control apparatus 10 presents the user with a recommended route selected based on the result of evaluating each candidate route by a predetermined indicator (such as the number of registered facilities passed by or the travel time in the vehicle 30) and makes reservations for two on-demand vehicle services according to the recommended route in response to a request from the user. Therefore, even in a case in which a user travels by transferring between on-demand vehicles belonging to a plurality of services, the user does not need to make separate reservations for on-demand vehicles with each service, thereby reducing the burden on the user.

(Configuration of Control Apparatus)

As illustrated in FIG. 1, the control apparatus 10 includes a controller 11, a memory 12, and a communication interface 13.

The controller 11 includes at least one processor, at least one programmable circuit, at least one dedicated circuit, or a combination of these. The controller 11 controls operations of the entire control apparatus 10.

The memory 12 includes one or more memories. The memories included in the memory 12 may each function as, for example, a main memory, an auxiliary memory, or a cache memory. The memory 12 stores any information used for operations of the control apparatus 10. For example, the memory 12 may store a system program, an application program, a database, map information, operation information for each service, and the like. The information stored in the memory 12 may be updated with, for example, information acquired from the network 40 via the communication interface 13.

The communication interface 13 includes at least one interface for communication for connecting to the network 40. The interface for communication is compliant with, for example, mobile communication standards, wired local area network (LAN) standards, or wireless LAN standards, but is not limited to these, and may be compliant with any communication standards. In the present embodiment, the control apparatus 10 communicates with the terminal apparatuses 20 and the vehicles 30 via the communication interface 13 and the network 40.

In the present embodiment, the second information indicating the information on the plurality of boarding/alighting points 121-127 and the operation status of the vehicles 30 in each of the services A111 and B112 is stored in the memory 12 of the control apparatus 10. The operation of the vehicles 30 in each of the services A111 and B112 is managed on the control apparatus 10. Alternatively, the storage of the second information and the operation management of the vehicles 30 may be handled on a network storage or information processing apparatus separate from the control apparatus 10 for each on-demand vehicle service.

(Configuration of Terminal Apparatus)

As illustrated in FIG. 1, the terminal apparatus 20 includes a controller 21, a memory 22, a communication interface 23, and an input/output interface 24.

The controller 21 includes at least one processor, at least one programmable circuit, at least one dedicated circuit, or a combination of these. The controller 21 controls operations of the entire terminal apparatus 20.

The memory 22 includes one or more memories. The memories included in the memory 22 may each function as, for example, a main memory, an auxiliary memory, or a cache memory. The memory 22 stores any information used for operations of the terminal apparatus 20. For example, the memory 22 may store a system program, an application program, map information, or the like. The information stored in the memory 22 may be updated with, for example, information acquired from the network 40 via the communication interface 23.

The communication interface 23 includes at least one interface for communication for connecting to the network 40. The interface for communication is compliant with, for example, a mobile communication standard or a wireless LAN standard but is not limited to these and may be compliant with any communication standard. In the present embodiment, the terminal apparatus 20 communicates with the control apparatus 10 via the communication interface 23 and the network 40.

The input/output interface 24 is a Human Machine Interface (HMI) that accepts input operations from the user and outputs the processing results of the terminal apparatus 20 to the user. The input/output interface 24 is, for example, configured as a touch screen integrated provided with a display, but this example is not limiting. For example, the input/output interface 24 may accept input operations from the user using physical keys, capacitive keys, a pointing device, a microphone, or the like. The input/output interface 24 may also output information to the user through a speaker or vibrator.

(Configuration of Vehicle)

As illustrated in FIG. 1, the vehicle 30 includes a controller 31, a memory 32, a communication interface 33, and a positioner 34.

The controller 31 includes at least one processor, at least one programmable circuit, at least one dedicated circuit, or a combination of these. The controller 31 controls operations of the entire vehicle 30.

The memory 32 includes one or more memories. The memories included in the memory 32 may each function as, for example, a main memory, an auxiliary memory, or a cache memory. The memory 32 stores any data used for the operations of the vehicle 30. For example, the memory 32 may store a system program, an application program, map information, or the like. The information stored in the memory 32 may be updated with, for example, information acquired from the network 40 via the communication interface 33.

The communication interface 33 includes at least one interface for communication for connecting to the network 40. The communication interface is compliant with mobile communication standards, for example, but not limited to these, and may be compliant with any communication standard. In the present embodiment, the vehicle 30 communicates with the control apparatus 10 via the communication interface 33 and the network 40.

The positioner 34 includes one or more apparatuses configured to acquire positional information for the vehicle 30. Specifically, the positioner 34 includes a receiver corresponding to the Global Positioning System (GPS), for example, but is not limited to this and may include a receiver corresponding to any satellite positioning system.

Each vehicle 30 runs according to an operation schedule received from the control apparatus 10. Each vehicle 30 also transmits information on the position of the vehicle 30 measured by the positioner 34 to the control apparatus 10.

Operation Example 1

Figure 3:
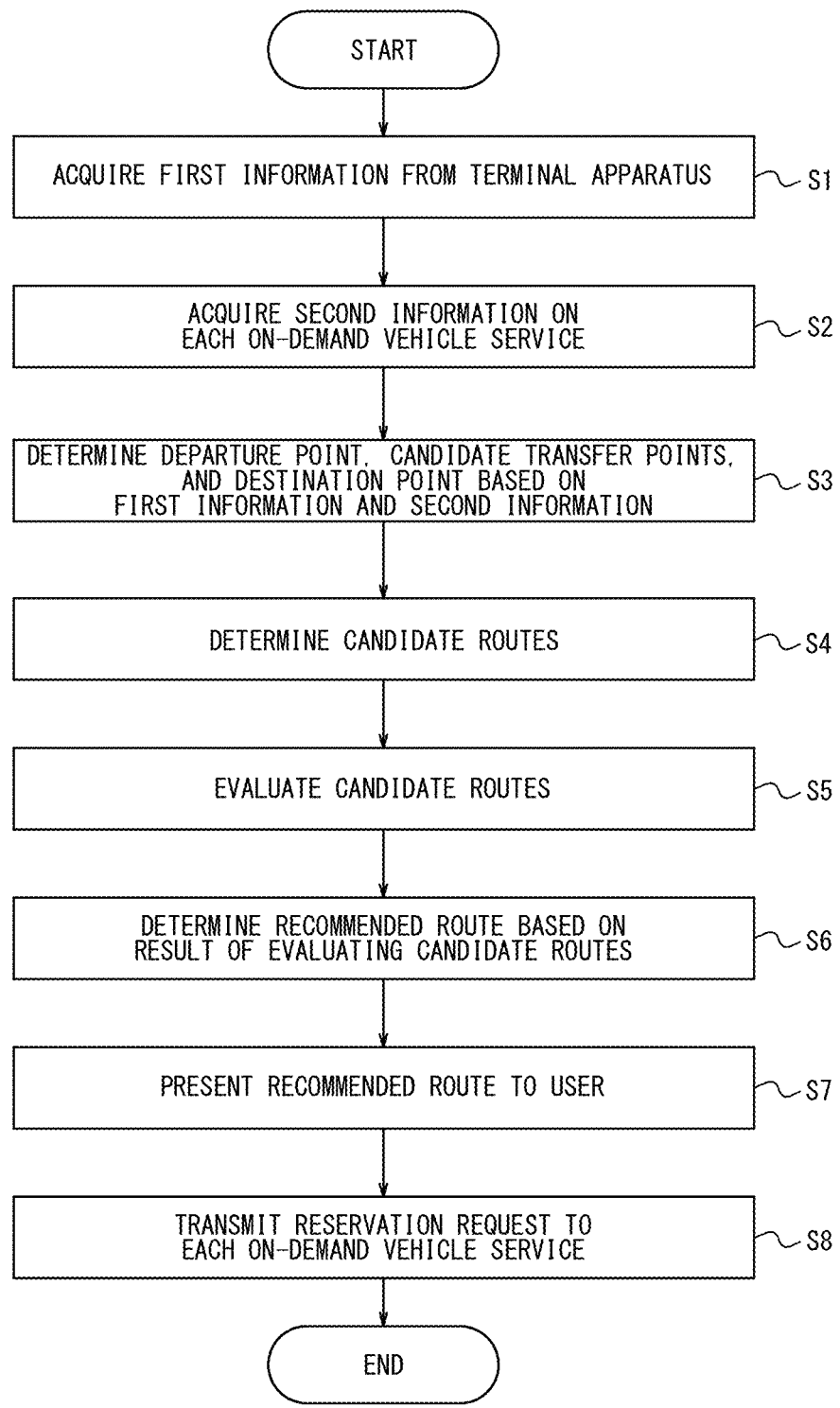
FIG. 3 is a flowchart illustrating an example of operations of a control apparatus.

An example of operations of the system 1 is described with reference to FIGS. 2 and 3. FIG. 3 is a flowchart illustrating an example of operations of the control apparatus 10. The operations of the control apparatus 10 described with reference to FIG. 3 can correspond to at least a portion of an information processing method according to the present embodiment. The steps in FIG. 3 are performed under the control of the controller 11 in the control apparatus 10.

Before the process in the flowchart begins, the user operates the terminal apparatus 20 to input the travel plan. The travel plan of the user includes the departure point 101, the destination point 102, the desired reservation date and time, and the number of people in the reservation. Here, the desired reservation date and time may include the desired boarding time and desired alighting time, or may include the desired departure time or desired arrival time. The user may select the boarding/alighting point (for example, boarding/alighting point 121) at which the user wishes to board as the departure point 101 and select the boarding/alighting point (for example, boarding/alighting point 123) at which the user wishes to alight as the destination point 102. The terminal apparatus 20 transmits these inputted pieces of information to the control apparatus 10 as the first information.

In step S1, the controller 11 of the control apparatus 10 receives the first information indicating the travel plan of the user from the terminal apparatus 20 via the communication interface 13.

In step S2, the controller 11 acquires second information indicating the plurality of boarding/alighting points 121-127 at which the vehicle 30 can be boarded and alighted from and the operation status of the vehicle 30 for each of the on-demand vehicle services 111, 112. In the present embodiment, the control apparatus 10 reads and retrieves the second information stored in the memory 12. The information for the boarding/alighting points 121-127 may include positional information for each of the boarding/alighting points 121-127. The information on the operation status of the vehicle 30 may include information such as the position and an already reserved operation schedule for each vehicle 30. In a case in which the second information is stored in network storage or the like for each service, the controller 11 acquires the second information from these network storage locations via the communication interface 13.

In steps S3-S6, the controller 11 of the control apparatus 10 executes a process to determine a recommended route for traveling by transferring between the first vehicle 30a belonging to the service A111 and the second vehicle 30b belonging to the service 30b based on the first information and the second information.

First, in step S3, the controller 11 determines, based on the first information and the second information, a boarding/alighting point for boarding the first vehicle 30a (first boarding/alighting point), a candidate transfer point for transferring from the first vehicle 30a to the second vehicle 30b, and a boarding/alighting point for alighting from the second vehicle 30b (second boarding/alighting point).

Specifically, the controller 11 may determine the nearest boarding/alighting point 121 from the departure point 101 indicated by the first information as the boarding/alighting point for boarding the first vehicle 30a. Alternatively, the controller 11 may determine a plurality of boarding/alighting points within a certain distance (for example, X meters) from the departure point 101 as boarding/alighting points for boarding the first vehicle 30a. The controller 11 may determine the boarding/alighting points 122, 124, 125, which are established in the overlapping portion between the service area of service A111 and the service area of service B112, as candidate transfer points for transferring from the first vehicle 30a to the second vehicle 30b. The controller 11 may determine the nearest boarding/alighting point 123 from the destination point 102 indicated by the first information as the boarding/alighting point for alighting from the second vehicle 30b. Alternatively, the controller 11 may determine a plurality of boarding/alighting points 123, 126 within a certain distance (for example, X meters) from the destination point 102 as boarding/alighting points for alighting from the second vehicle 30b. In the example in FIG. 2, the boarding/alighting point 127 is outside the service area of service B112 and therefore is not selected as the boarding/alighting point for alighting from the second vehicle 30b.

In step S4, the controller 11 determines at least one candidate route for traveling from the departure point 101 to the destination point 102 via the candidate transfer point. For example, in the area in FIG. 2, the controller 11 may determine the following candidate routes 1-3.

Candidate route 1: a route through departure point 101, boarding/alighting point 121, boarding/alighting point 122, boarding/alighting point 123, and destination point 102.

Candidate route 2: a route through departure point 101, boarding/alighting point 121, boarding/alighting point 124, boarding/alighting point 123, and destination point 102.

Candidate route 3: a route through departure point 101, boarding/alighting point 121, boarding/alighting point 125, boarding/alighting point 123, and destination point 102.

In step S5, the controller 11 evaluates each of the candidate routes 1-3 by a predetermined index. As such an index, the controller 11 may, for example, calculate the travel time. For example, the controller 11 may estimate the total time required to travel from the departure point 101 to the destination point 102 and use that time as an evaluation index. The controller 11 may instead evaluate each candidate route using the riding time (time spent in the vehicle 30) as an index. The controller 11 may instead use the time required to transfer between vehicles 30 at the boarding/alighting points 122, 124, 125 as such an evaluation index. The controller 11 may instead use the time traveling by walking as such an evaluation index. These times are determined by taking into account information about the operation schedules already reserved for the first vehicle 30a and the second vehicle 30b. Such an evaluation index is not limited to the examples listed here. Other examples of the evaluation index are discussed below.

In step S6, the controller 11 determines a candidate route included in the plurality of candidate routes 1-3 as the recommended route based on the result of evaluating each of the candidate routes 1-3 by the predetermined index. For example, the controller 11 may determine the route with the shortest total time, riding time, time required to transfer, or walking time in order to travel from the departure point 101 to the destination point 102 as the recommended route. The controller 11 may instead determine the route with the lowest weighted sum of the total travel time, riding time, transfer time, and walking time as the recommended route. The controller 11 may determine a plurality of routes with a high degree of recommendation as recommended routes based on the evaluation index. Here, the recommended route may include not only a geographic route, but also information on the estimated time of departure and estimated time of arrival at each point.

In step S7, the controller 11 presents the recommended route determined in step S6 to the user via the terminal apparatus 20. Specifically, the controller 11 transmits information indicating the recommended route determined in step S6 to the terminal apparatus 20 via the communication interface 13. In response, the terminal apparatus 20 displays the recommended route on the input/output interface 24 and accepts a selection by the user. When the user selects the desired recommended route, the terminal apparatus 20 transmits information indicating the recommended route selected by the user to the control apparatus 10 and requests that the control apparatus 10 make a reservation for each service 111, 112.

In step S8, the controller 11 transmits a reservation request, according to the recommended route, for the first vehicle 30a and second vehicle 30b to the on-demand vehicle service A111 and service B112 in response to a request from the terminal apparatus 20. Reservations are thereby made for both service A111 and service B112.

As described above, in the present embodiment, when a user inputs a travel plan, the control apparatus 10 determines a recommended route that conforms to that travel plan and makes reservations for each service according to the recommended route in response to a request by the user. Therefore, even in a case in which the user travels by transferring between the first vehicle 30a and second vehicle 30b belonging to a plurality of services 111, 112, the user does not need to make separate reservations for the first vehicle 30a and the second vehicle 30b with each service 111, 112. Therefore, according to the present embodiment, the burden on the user can be reduced.

Operation Example 2

In Operation Example 1, an example in which candidate routes are evaluated based on an index focused on travel time for the user was described, but the evaluation index is not limited to this example. For example, the controller 11 may determine, with greater priority, a route that passes near a facility that is likely to be of interest to the user as the recommended route. By traveling on such a route on a priority basis, the facility can be advertised to the user. This can, for example, increase the likelihood that the user will visit the facility on the way back from the destination point 102 to the departure point 101 or on another occasion.

Specifically, for example, the control apparatus 10 may store information such as the location and category (for example, restaurant, public facility, school, museum, temple/shrine, or the like) of each facility 131-134 in the target area of the on-demand vehicle in the memory 12 in advance. Additionally, in step S5, the controller 11 may assign a greater evaluation score to candidate routes that pass more facilities that are likely to be of interest to the user. For example, the control apparatus 10 may store categories of facilities of interest to each user in the memory 12 in advance. The control apparatus 10 may then use the count of facilities that are located near the candidate route and match the user's interests as an evaluation score. The existence of a facility near a candidate route may be determined based on the distance between the facility and the candidate route being less than a certain value.

As a facility that is likely to be of interest to the user, the controller 11 may, for example, select a facility such that the number of times the user has visited the facility in the past or the number of times the user has used a coupon at the facility is equal to or greater than a predetermined threshold or less than a predetermined threshold. Here, the control apparatus 10 may store information regarding the number of times the user has visited the facility in the past or the number of times the user has used a coupon at the facility in the memory 12 in advance. The controller 11 may select a facility that is less than a certain distance from a boarding/alighting point that the user has previously alighted from as a facility that the user has previously visited.

Alternatively, when searching for a route between the departure point 101 or the destination point 102 and the candidate transfer point, the controller 11 may search for the route that maximizes the number of facilities on the route, without the travel time by the vehicle 30 exceeding an allowable value. The "allowable value" may be defined based on the minimum travel time between the departure point 101 or the destination point 102 and the candidate transfer point. For example, the "allowable value" may be the value yielded by adding a certain time a to the minimum travel time between the departure point 101 or the destination point 102 and the candidate transfer point (minimum travel time+α). Alternatively, the "allowable value" may be the value yielded by multiplying the minimum travel time between the departure point 101 or the destination point 102 and the candidate transfer point by a certain value β (1<β) (minimum travel time×β).

Operation Example 3

As described above, in step S4, the controller 11 determines the routes from the departure point 101 to the candidate transfer points and the routes from the candidate transfer points to the destination point 102 as candidate routes. Here, the controller 11 need not search for a route by targeting the entire area served by the on-demand vehicle service when determining the candidate routes. For example, the controller 11 may select an area to search for a route in the target areas of the services based on factors such as the positional relationship between the departure point 101 and the destination point 102 and may then search for a route within the selected area.

Figure 4:
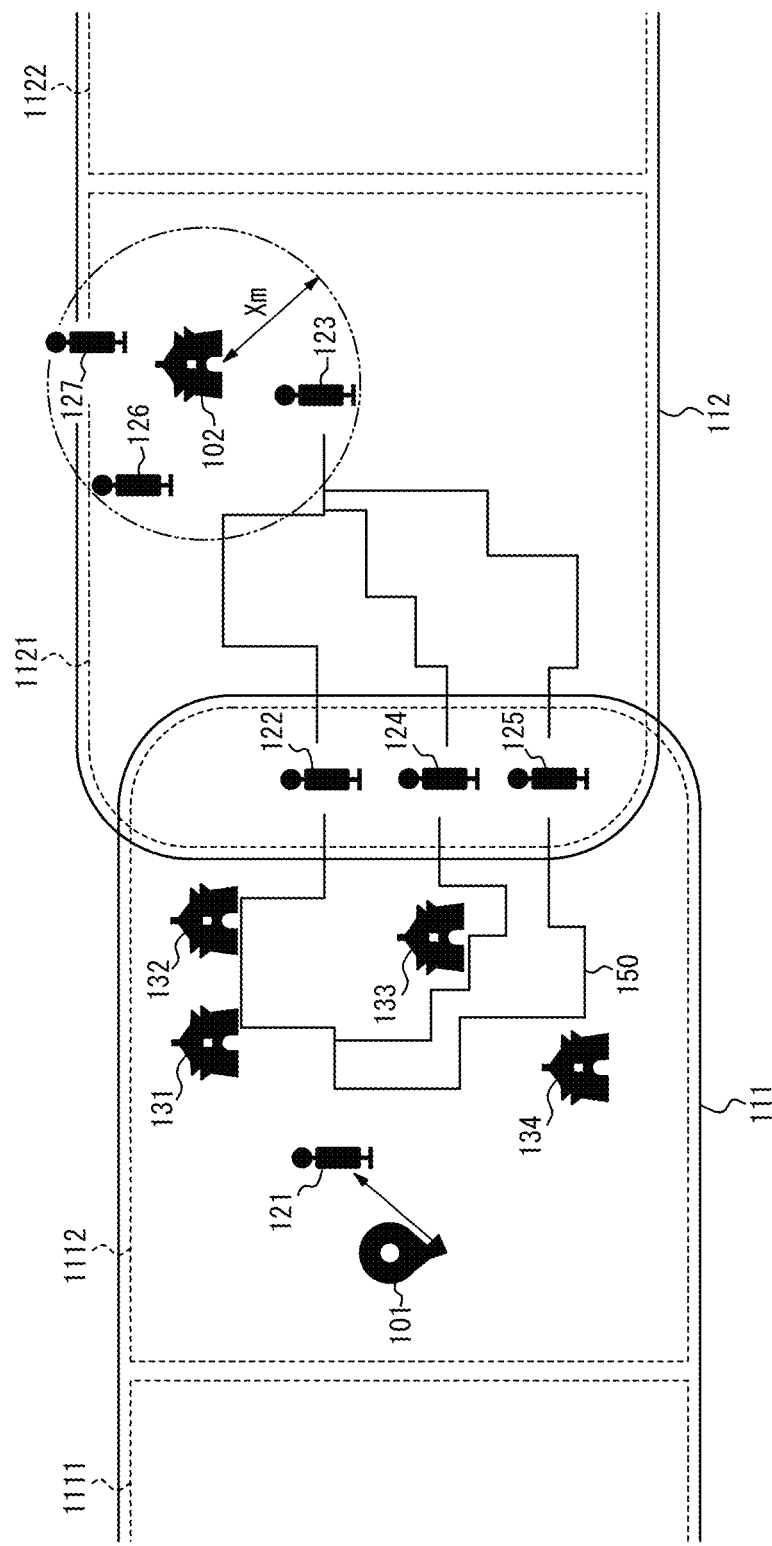
FIG. 4 is a diagram illustrating an example of areas where on-demand vehicle services are provided.

FIG. 4 is a diagram illustrating an example of areas where on-demand vehicle services are provided. In FIG. 4, the target area of service A111 includes area 1111 and area 1112. The target area of service B112 includes area 1121 and area 1122. The departure point 101 is located in area 1112 and the destination point 102 is located in area 1121. It is assumed that areas 1111, 1112, 1121, and 1122 have the positional relationship illustrated in FIG. 4. In such a case, when searching for a route from the departure point 101 to the candidate transfer points 122, 124, 125, the controller 11 need only search for routes in area 1112, without considering routes in area 1111. When searching for a route from candidate transfer points 122, 124, 125 to the destination point 102, the controller 11 need only search for routes in area 1121, without considering routes in area 1122. In this way, the control apparatus 10 can perform an efficient route search without extracting routes that are clearly circuitous as candidate routes.

Operation Example 4

In step S3 of Operation Example 1, an example was described in which the controller 11 determines the boarding/alighting points 122, 124, 125, which are established in the overlapping portion between the service areas of service A111 and service B112, as candidate transfer points. However, it may be the case that there is no overlap between the service areas of service A111 and service B112. In such a case, the controller 11 may evaluate each candidate route using the travel time by walking from the alighting location of the first vehicle 30a to the boarding location of the second vehicle 30b as one index.

Figure 5:
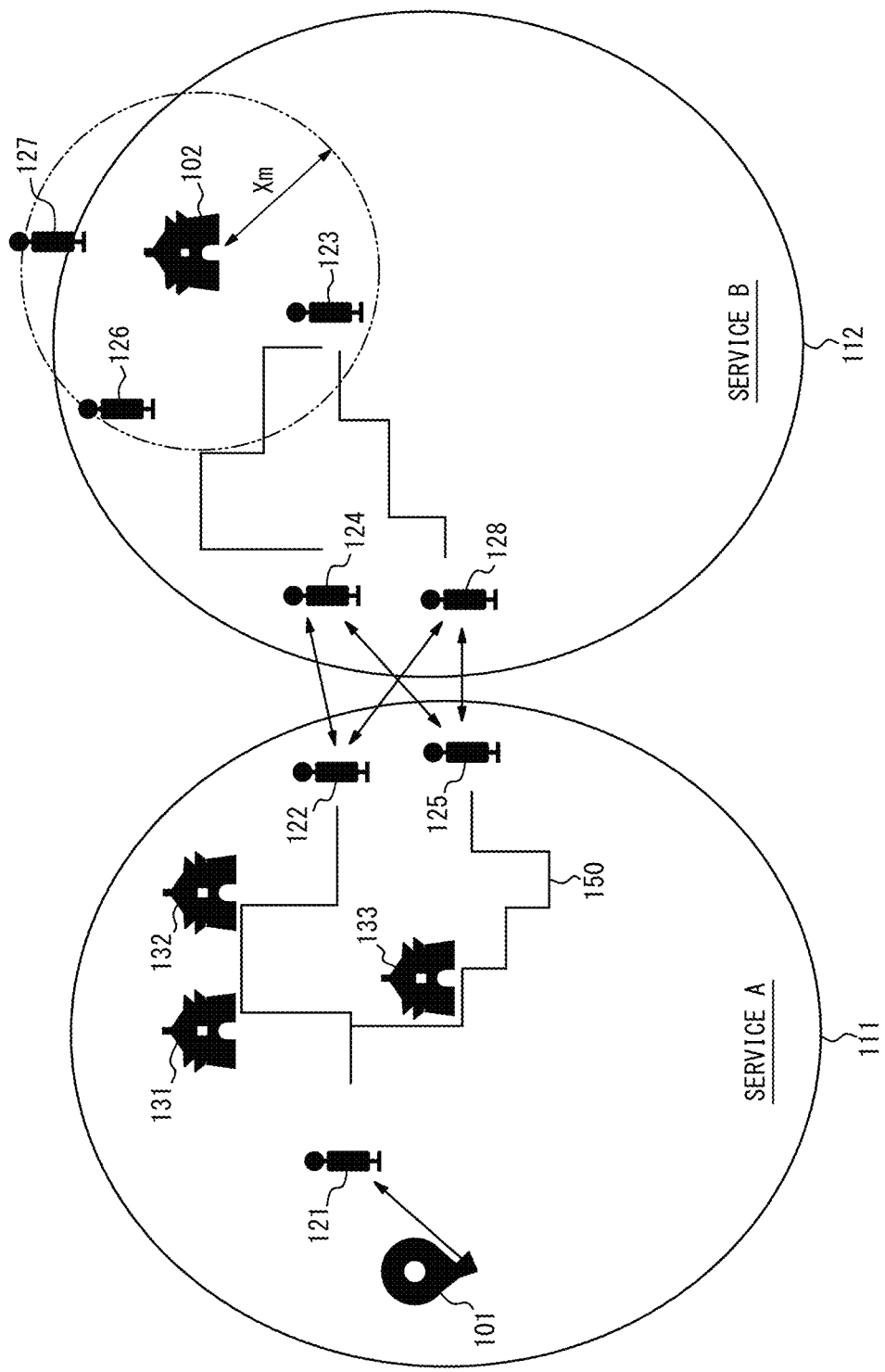
FIG. 5 is a diagram illustrating an example of areas where on-demand vehicle services are provided.

FIG. 5 is a diagram illustrating an example of areas where on-demand vehicle services are provided. In the example in FIG. 5, there is no overlap between the service areas of service A111 and service B112. For travel between such service areas where there is no overlap, in step S3, the controller 11 may determine the candidate transfer points based on the positional relationship between the service areas of each service. For example, in the example in FIG. 5, the controller 11 may determine the boarding/alighting points 122, 125 located near service B112 as candidate transfer points within service A111. Similarly, the controller 11 may determine the boarding/alighting points 124, 128 located near service A111 as candidate transfer points within service B112.

Alternatively, at least one candidate transfer point may be stored in the memory 12 in advance for each of the travel source and destination services, and in step S3, the controller 11 may determine the candidate transfer points by referring to such information stored in advance. For example, in the example in FIG. 5, the boarding/alighting points 122, 125 and boarding/alighting points 124, 128 may be stored in the memory 12 in advance as candidate transfer points between service A111 and service B112, together with identification information for service A111 and service B112. Then, in step S3, the controller 11 may determine the boarding/alighting points 122, 125 and the boarding/alighting points 124, 128, stored in advance in correspondence with service A111 and service B112, as candidate transfer points.

In step S5, the controller 11 may evaluate the candidate routes using the travel time by walking (transfer time) between the boarding/alighting points 122, 125 and the boarding/alighting points 124, 128 as one index. Specifically, there are four combinations of these candidate transfer points, i.e., (1) boarding/alighting points 122, 124, (2) boarding/alighting points 122, 128, (3) boarding/alighting points 125, 124, and (4) boarding/alighting points 125, 128. The controller 11 may use the shortest travel time by walking among these combinations as one evaluation index. The controller 11 can thereby determine a route that is less burdensome for the user as a recommended route, even in a case in which the route involves travel between non-overlapping service areas.

In step S5, the controller 11 may calculate an evaluation score that comprehensively reflects a plurality of evaluation indices by combining the aforementioned plurality of evaluation indices after weighting them. In other words, the controller 11 may evaluate each candidate route by combining two or more of the above-described indices. For example, the controller 11 may determine the cost for each index and determine the candidate route with the lowest total cost as the recommended candidate. The controller 11 can thereby determine an appropriate route as the recommended route based on multiple perspectives.

While the present disclosure has been described with reference to the drawings and embodiments, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the control apparatus 10 in the above embodiment are distributed to multiple computers capable of communicating with each other can be implemented. For example, an embodiment in which some or all of the components of the control apparatus 10 are provided in the terminal apparatus 20 or the vehicle 30 can also be implemented.

For example, an embodiment in which a general purpose computer functions as the control apparatus 10 according to the above embodiment can also be implemented. Specifically, a program in which processes for realizing the functions of the control apparatus 10 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. An information processing method to be executed by an information processing apparatus communicating with a terminal apparatus used by a user, the information processing method comprising:
    receiving, from the terminal apparatus, first information indicating a travel plan of the user;
    acquiring, for each on-demand vehicle service in a plurality of on-demand vehicle services, second information indicating a plurality of boarding/alighting points at which a vehicle can be boarded and alighted from and an operation status of the vehicle;
    determining, based on the first information and the second information, a recommended route for traveling by transferring between a first vehicle belonging to a first on-demand vehicle service and a second vehicle belonging to a second on-demand vehicle service;
    presenting the recommended route to the user via the terminal apparatus; and
    in response to a request from the terminal apparatus,
        reserving the first vehicle and the second vehicle with the first on-demand vehicle service and the second on-demand vehicle service in accordance with the recommended route,
        determining an operation schedule of the first vehicle and the second vehicle in accordance with the recommended route, and
        controlling, by a communication from the information processing apparatus, the first vehicle and the second vehicle to travel according to the operation schedule, wherein
    each of the first vehicle and the second vehicle is a fully automated vehicle automated at Level 5 according to a level classification defined by Society of Automotive Engineer,
    in the determining of the recommended route,
        a first boarding/alighting point for boarding the first vehicle, a candidate transfer point for transferring from the first vehicle to the second vehicle, and a second boarding/alighting point for alighting from the second vehicle are determined,
        at least one candidate route for traveling from the first boarding/alighting point to the second boarding/alighting point via the candidate transfer point is determined, and
        based on a result of evaluating each candidate route in the at least one candidate route by a predetermined index, a candidate route included in the at least one candidate route is determined as the recommended route, and
    in the determining of the recommended route, in response to determining (i) no overlap between a first service area, where the first on-demand vehicle service is provided, and a second service area, where the second on-demand vehicle service is provided, and (ii) no service area bridging between the first service area and the second service area,
        based on a positional relationship between the first service area and the second service area, each of at least one third boarding/alighting point for alighting from the first vehicle in the first service area and at least one fourth boarding/alighting point for boarding the second vehicle in the second service area is determined as the candidate transfer point, and
        at least one route for traveling from the first boarding/alighting point to the second boarding/alighting point via the at least one third boarding/alighting point and the at least one fourth boarding/alighting point is determined as the recommended route.

2. The information processing method according to claim 1, wherein
    in the determining of the recommended route, the candidate route included in the at least one candidate route is determined as the recommended route based on a result of evaluating a total travel time as the predetermined index.

3. The information processing method according to claim 1, wherein
    in the determining of the recommended route, the candidate route included in the at least one candidate route is determined as the recommended route based on a result of evaluating a count of facilities that are located near the candidate route and match interests of the user as the predetermined index.

4. The information processing method according to claim 1, wherein
    in the determining of the recommended route, the candidate route included in the at least one candidate route is determined as the recommended route based on a result of evaluating a transfer time by walking as the predetermined index.

5. The information processing method according to claim 3, wherein
    the facilities include a first facility to which the user has visited in the past, and a second facility at which the user has used a coupon in the past, and
    each of the first facility and the second facility is weighted greater for evaluating the candidate route than other facilities among the facilities.

6. An information processing method to be executed by an information processing apparatus communicating with a terminal apparatus used by a user, the information processing method comprising:
    receiving, from the terminal apparatus, first information indicating a travel plan of the user;
    acquiring, for each on-demand vehicle service in a plurality of on-demand vehicle services, second information indicating a plurality of boarding/alighting points at which a vehicle can be boarded and alighted from and an operation status of the vehicle;

determining, based on the first information and the second information, a recommended route for traveling by transferring between a first vehicle belonging to a first on-demand vehicle service and a second vehicle belonging to a second on-demand vehicle service;

presenting the recommended route to the user via the terminal apparatus; and in response to a request from the terminal apparatus, reserving the first vehicle and the second vehicle with the first on-demand vehicle service and the second on-demand vehicle service in accordance with the recommended route, determining an operation schedule of the first vehicle and the second vehicle in accordance with the recommended route, and controlling, by a communication from the information processing apparatus, the first vehicle and the second vehicle to travel according to the operation schedule, wherein each of the first vehicle and the second vehicle is a fully automated vehicle automated at Level 5 according to a level classification defined by Society of Automotive Engineer, in the determining of the recommended route, a first boarding/alighting point for boarding the first vehicle, a candidate transfer point for transferring from the first vehicle to the second vehicle, and a second boarding/alighting point for alighting from the second vehicle are determined, at least one candidate route for traveling from the first boarding/alighting point to the second boarding/alighting point via the candidate transfer point is determined, and based on a result of evaluating each candidate route in the at least one candidate route by a predetermined index, a candidate route included in the at least one candidate route is determined as the recommended route, in the determining of the recommended route, the candidate route included in the at least one candidate route is determined as the recommended route based on a result of evaluating a count of facilities that are located near the candidate route and match interests of the user as the predetermined index, the facilities include a first facility to which the user has visited in the past, and a second facility at which the user has used a coupon in the past, and each of the first facility and the second facility is weighted greater for evaluating the candidate route than other facilities among the facilities.

* * * * *